US007053365B2

(12) United States Patent
Shimomura

(10) Patent No.: US 7,053,365 B2
(45) Date of Patent: May 30, 2006

(54) CHROMATOGRAPH MASS SPECTROMETRIC APPARATUS AND METHOD OF CALIBRATING THE SAME

(75) Inventor: Manabu Shimomura, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 0 days.

(21) Appl. No.: 11/079,740

(22) Filed: Mar. 14, 2005

(65) Prior Publication Data

US 2005/0211892 A1 Sep. 29, 2005

(30) Foreign Application Priority Data

Mar. 25, 2004 (JP) ............................. 2004-088176

(51) Int. Cl.
*B01D 59/44* (2006.01)
*H01J 49/00* (2006.01)
*G01N 24/00* (2006.01)

(52) U.S. Cl. ....................... 250/281; 250/282; 436/173

(58) Field of Classification Search ................ 250/281, 250/282; 436/173

See application file for complete search history.

(56) References Cited

U.S. PATENT DOCUMENTS 4,008,388 A * 2/1977 McLafferty et al. .......... 702/27
5,545,895 A * 8/1996 Wright et al. ............... 250/282
6,580,067 B1 * 6/2003 Yamada et al. ............. 250/281

FOREIGN PATENT DOCUMENTS

JP 10-132786 5/1998

* cited by examiner

*Primary Examiner*—John R. Lee
*Assistant Examiner*—Jennifer Yantomo
(74) *Attorney, Agent, or Firm*—Rankin, Hill, Porter & Clark LLP

(57) ABSTRACT

First, normal calibration is executed by introducing a standards sample to an MS portion, thereafter, an adjusting sample is introduced to a GC portion, and a mass spectrum is acquired by executing mass spectrometry by the MS portion with regard to an object substance separated by a column. A data processing portion compares a measured mass spectrum and a standard spectrum and modifies a standard spectrum constituting a target in executing calibration by using a standard sample from the result. The standard spectrum modified in this way is reflected with an error factor of a dispersion in a purity of the standard sample or the like and therefore, when recalibration of the MS portion using the standard sample is executed by constituting a target by the modified standard spectrum, a difference among apparatus is resolved.

2 Claims, 3 Drawing Sheets

FIG. 3

| MASS NUMBER | 69 | 131 | 219 | 414 | 502 |
|---|---|---|---|---|---|
| TARGET [%] | 100 | 30 | 30 | 4 | 4 |

FIG. 4

| MASS NUMBER | 51 | 127 | 198 | 275 | 442 |
|---|---|---|---|---|---|
| APPARATUS A (MEASURED VALUE) | 42 | 27 | 50 | 16 | 100 |
| APPARATUS B (MEASURED VALUE) | 35 | 26 | 46 | 16 | 100 |
| STANDARD VALUE | 45 | 45 | 75 | 35 | 100 |
| Kn OF APPARATUS A | 1.07 | 1.67 | 1.5 | 2.19 | 1.00 |

FIG. 5

| MASS NUMBER | 69 | 131 | 219 | 414 | 502 |
|---|---|---|---|---|---|
| TARGET [%] | 100 | 30 | 30 | 4 | 4 |
| fn OF APPARATUS A | 1.21 | 1.66 | 1.69 | 1.20 | 1.00 |
| T [%] | 121 | 50 | 51 | 5 | 4 |
| T [%] | 100 | 41 | 42 | 4 | 3 |

CHROMATOGRAPH MASS SPECTROMETRIC APPARATUS AND METHOD OF CALIBRATING THE SAME

This application claims foreign priority based on Japanese patent application JP 2004-088176, filed on Mar. 25, 2004, the contents of which is incorporated herein by reference in its entirety.

BACKGROUND OF THE INVENTION

1. Field of the Invention

The present invention relates to a chromatograph mass spectrometric apparatus, such as of a gas chromatograph mass spectrometric apparatus, a liquid chromatograph mass spectrometric apparatus or the like, for executing qualitative analysis and quantitative analysis by chromatography by constituting a detector by a mass spectrometer. More specifically, the present invention relates to a method of calibrating a mass spectrometric portion in a chromatograph mass spectrometric apparatus.

2. Description of the Related Art

In recent years, a chromatograph mass spectrometric apparatus combined with a gas chromatograph or a liquid chromatograph and a mass spectrometric apparatus has been used widely in qualitative analysis or quantitative analysis of various samples. Although an explanation will be given by taking an example of a gas chromatograph mass spectrometric apparatus (abbreviated as GC/MS) as follows, the situation stays the same also in a liquid chromatograph mass spectrometric apparatus (LC/MS).

In GC/MS, it is necessary to ensure accuracy of the apparatus by periodically or nonperiodically executing calibration. One of objects of such a calibration in GC/MS resides in increasing accuracy of qualitative analysis using common spectra library by reducing an individual difference among apparatus, or increasing accuracy of comparing results provided by different apparatus. A related-art method for correcting a difference of mass spectra by an apparatus is as follows (refer to, for example, JP-A-10-132786 or the like).

That is, in place of a sample gas introduced from an outlet of a column of GC, a standard sample for mass calibration previously mounted by switching valves is introduced to an ion source of a mass spectrometric apparatus. The standard sample in which a peak of a fragment ion regularly emerges is convenient, for example, in a relatively low mass number region, PFTBA (Perfluorotributylamine) is frequently used. When such a standard sample is subjected to mass spectrometry, a sharp peak emerges in a known mass number on a mass spectrum. A standard spectrum for the standard sample is separately provided, and a voltage applied to a lens electrode or a bias voltage applied to a quadrupole mass filter may pertinently be adjusted in a mass spectrometric apparatus to be proximate to a pattern of the standard spectrum.

However, actually, there is a considerably large dispersion in a purity of a standard sample of PFTBA or the like. That is, there is a case in which an individual difference exists in such a standard sample per se. In such a case, there poses a problem at even when patterns of mass spectra constituting results of analyzing respective standard samples in different apparatus are made to coincide with one standard spectrum, an individual difference among apparatus cannot be corrected.

SUMMARY OF THE INVENTION

The invention has been carried out in order to resolve the problem.

It is an object of the present invention to provide a chromatograph mass spectrometric apparatus capable of eliminating an individual difference among apparatus by making patterns of mass spectra of different apparatus coincide with each other with high accuracy even when a purity of a standard sample for mass calibration is low, and a method of calibrating the chromatograph mass spectrometric apparatus.

In order to achieve the object of the present invention, there is provided a chromatograph mass spectrometric apparatus for separating a plurality of components of a sample over time by a column of a chromatograph portion and introducing the respective components to a mass spectrometric portion to successively subject to mass spectrometry. The chromatograph mass spectrometric apparatus comprises:

a) a preparatory adjusting section for adjusting various parameters of the mass spectrometric portion by constituting a target by a predetermined standard spectrum for a standard sample while acquiring a mass spectrum of the standard sample by introducing the standard sample to the mass spectrometric portion;

b) an adjusting sample analyzing section for introducing a predetermined adjusting sample including a substance a mass spectrum of which is known to the mass spectrometric portion and acquiring a mass spectrum for the substance of the adjusting sample in a state of being adjusted by the preparatory adjusting section;

c) an information modifying section for modifying the predetermined standard spectrum for the standard sample based on a difference between a mass spectrum for the adjusting sample actually provided from the adjusting sample analyzing section and a predetermined standard spectrum of the adjusting sample; and d) a final adjusting section for adjusting the various parameters of the mass spectrometric portion by constituting a target by a modified standard spectrum provided from the information modifying section while acquiring a mass spectrum by introducing the standard sample to the mass spectrometric portion.

Here, the standard sample for mass calibration introduced directly into the mass spectrometric portion is, for example, PFTBA. On the other hand, although as a predetermined sample introduced to the chromatograph portion, for example, in GC/MS, DFTPP (Decafluorotriphenylphosin) or BFP (p-Bromofluorobenzene) or the like can be used, basically, other sample including various substances can be used so far as mass spectra thereof are known.

According to the chromatograph mass spectrometric apparatus of the invention, first, the mass spectrometric portion is adjusted by using the standard sample by the preparatory adjusting section. That is, various parameters (for example, voltage applied to ion lens and the like) of the mass spectrometric portion is adjusted by constituting the target by the predetermined standard spectrum for the standard sample while acquiring the mass spectrum by introducing the standard sample to the mass spectrometric portion. When the standard sample is assumedly ideal, an individual difference is not to be brought about among apparatus at a time point of finishing the preparatory adjustment. However, actually, a difference is brought about among mass spectra by influence of an impurity or the like mixed to the standard sample, and the individual difference is brought about in order to make the mass spectra coincide with one standard spectrum. Hence, successively, the mass spectrum of the object substance included in the adjusting sample is acquired by the adjusting sample analyzing section.

In the analysis, various components included in the adjusting sample (also including impurity) are separated over time by the column of the chromatograph and therefore, even when an impurity is mixed thereto assumedly, influence of the substance is hardly effected and the mass spectrum with regard to the object substance can be acquired with a high purity. Although inherently, it is preferable to adjust the mass spectrometric portion such that the actually provided mass spectrum becomes proximate to the predetermined standard spectrum for the adjusting sample, a time period until the object substance comes out from the chromatograph portion is an extremely short time period and therefore, such an adjustment cannot be finished during the time period.

Hence, the information modifying section compares the actually provided mass spectrum with the predetermined standard spectrum of the adjusting sample and modifies the predetermined standard spectrum per se for the standard sample based on a difference therebetween. That is, a deviation in the mass spectrum in analyzing the adjusting sample is converted into a deviation in analyzing the standard sample. The deviation is mainly caused by the fact that the standard sample is not ideal in adjustment using the standard sample. Therefore, modification of the standard spectrum for the standard sample corresponds to correction of the above-described dispersion factor of the standard sample. Further, the final adjusting section adjusts again the various parameters of the mass spectrometric portion by constituting the target by the modified standard spectrum while introducing the standard sample to the mass spectrometric portion and acquiring the mass spectrum.

According to the chromatograph mass spectrometric apparatus of the invention, although apparently, the mass spectrometric portion is adjusted by using the standard sample, actually, the invention is substantially equivalent to adjustment of the mass spectrometric portion by utilizing the mass spectrum of the object substance having the high purity included in the adjusting sample separated by the chromatogram. Therefore, spectra of different apparatus can be made to coincide with each other with high accuracy and the individual difference can be reduced without being influenced by the dispersion of the purity of the standard sample or the like. Thereby, accuracy of qualitative analysis using the common spectra library is promoted and accuracy in comparing results acquired by different apparatus is also promoted.

BRIEF DESCRIPTION OF THE DRAWINGS

FIG. 3 is a diagram for explaining a specific example with regard to the calibration processing.

FIG. 4 is a diagram for explaining a specific example with regard to the calibration processing.

FIG. 5 is a diagram for explaining a specific example with regard to the calibration processing.

DETAILED DESCRIPTION OF THE INVENTION

Figure 1:
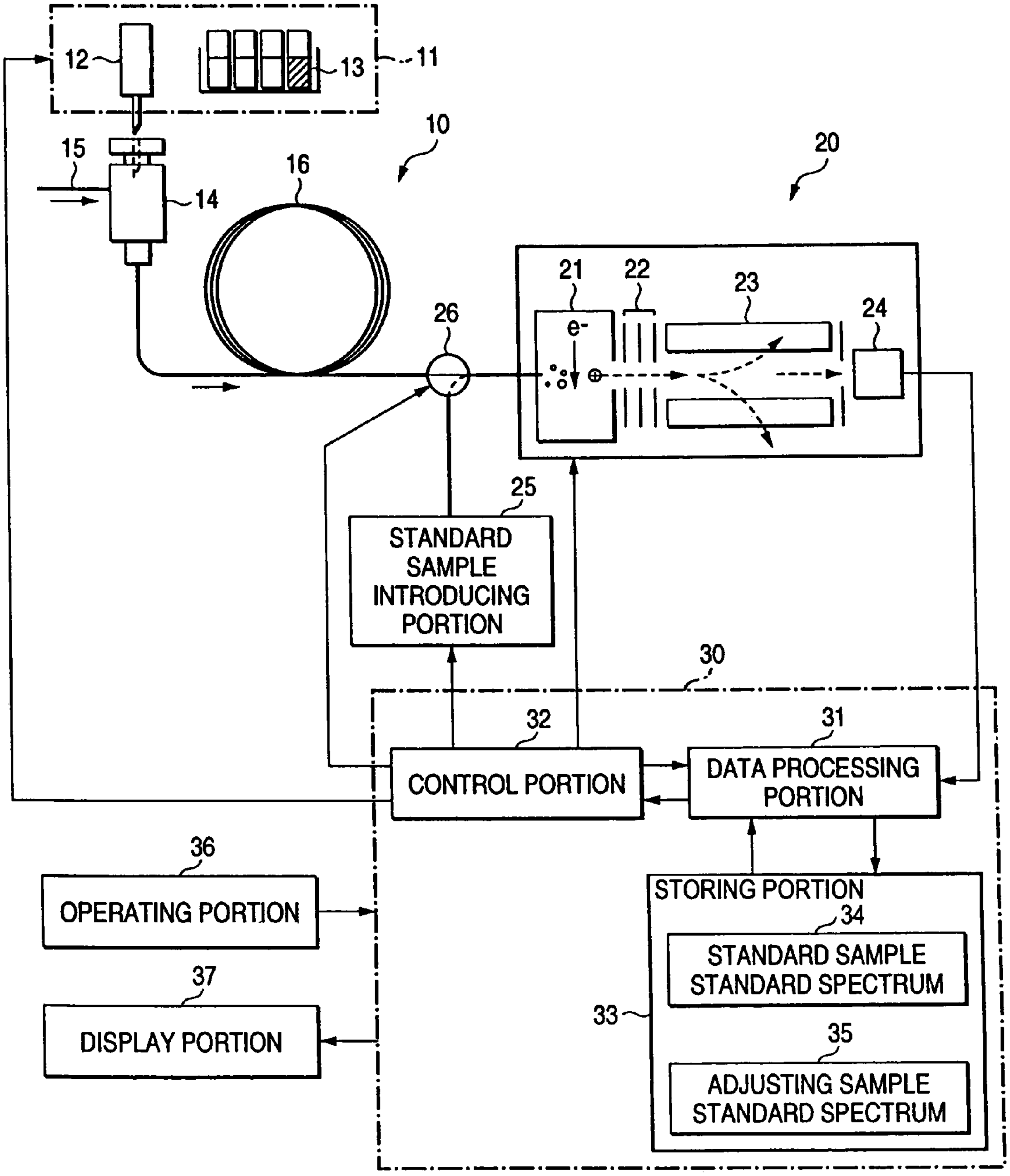
FIG. 1 is a view showing an essential portion of GC/MS according to an embodiment of the invention.

An explanation will be given of GC/MS according to an embodiment of the invention in reference to the drawings as follows. FIG. 1 is a view showing an essential portion of GC/MS of the embodiment.

An inlet of a column (capillary column) 16 of a GC portion 10 is provided with a sample vaporizing chamber 14, and a carrier gas supplied from a carrier gas flow path 15 is made to flow to the column 16 substantially by a constant flow rate. A liquid sample injected to the sample vaporizing chamber 14 by an injector 12 constituting a portion of an automatic sampler 11 is immediately vaporized and is delivered into the column 16 by being borne on a carrier gas flow. Further, although not illustrated, the column 16 is included in a column oven. During a time period of passing the column 16, respective sample components in the sample gas are separated over time, come out from the column 16 and are introduced into an ion source 21 of an MS portion 20. Molecules of components introduced into the ion source 21 are ionized by an ionizing method of, for example, a thermoelectron impact method or the like, generated ions are drawn out to an outer side of the ion source 21 and introduced into a quadrupole mass filter (or other mass separator) 23 via an ion lens 22 or the like. The quadrupole filter 23 is applied with a voltage superposed with a direct current voltage and a high frequency voltage, only an ion having a mass number in accordance with the applied voltage passes a space in a longitudinal axis direction and reaches an ion detector 24 to be detected.

The ion detector 24 outputs an electric signal in accordance with a number of ions (ion flow intensity) reaching the ion detector 24, the signal is inputted to a data processing portion 31. In the data processing portion 31, a mass spectrum, a mass chromatogram, total ion chromatograph or the like is formed and further, various analyze processings of qualitative analysis, quantitative analysis or the like are executed. A control portion 32 performs controls of respective portions of the GC portion 10 and the MS portion 20. The control portion 32 and the data processing portion 31 are constituted substantially centering on a personal computer (PC) 30 and the controls and operation processings are realized by executing various controls and processing programs installed to the computer 30. PC 30 is connected with an operating portion 36 constituting a pointing devise of, for example, a keyboard, a mouse or the like and also connected with a display portion 37 of a liquid crystal display or the like.

GC/MS of the embodiment is provided with a standard sample introducing portion 25 for introducing a standard sample for mass calibration (for example, PFTBA) by a switch valve 26 to a flow path reaching the ion source 21 from the GC portion 10. The automatic sampler 11 is prepared with an adjusting sample of DFTPP or the like. Furthermore, a storing portion 33 connected to the data processing portion 31 is previously stored with a standard sample standard spectrum 34 constituting a reference in analyzing a standard sample for mass calibration and an adjusting sample standard spectrum 35 constituting a reference in analyzing the adjusting sample.

Figure 2:
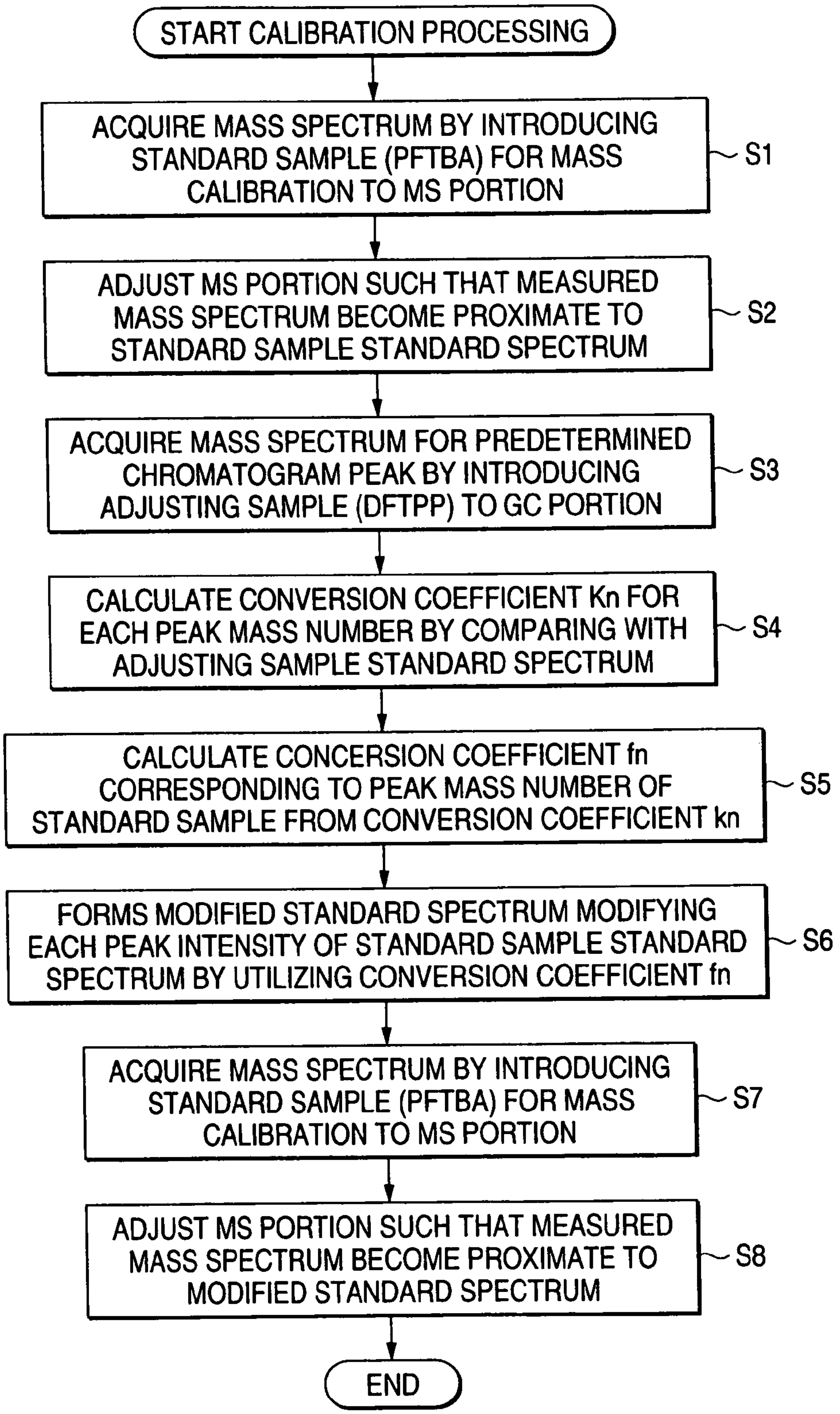
FIG. 2 is a flowchart showing a procedure of calibration processings of GC/MS according to the embodiment.

Next, a calibration processing constituting a characteristic operation of GC/MS of the embodiment will be explained in reference to FIG. 2 through FIG. 5. FIG. 2 is a flowchart showing a procedure of the calibration processing of GC/MS of the embodiment, and FIG. 3 through FIG. 5 are diagrams for explaining specific examples with regard to the calibration processing.

When an operator instructs to start calibration by the operating portion 36, first, under control of the control portion 32, the switch valve 26 is switched to select the standard sample introducing portion 25 and the standard sample is introduced to the ion source 21 of the MS portion 20. Mass spectrometry is executed on the standard sample over a predetermined mass range and the data processing portion 31 forms amass spectrum based on a detecting signal received from the ion detector 24 at this occasion (step S1).

Next, the data processing portion 31 reads the standard sample standard spectrum 34 from the storing portion 33, calculates a difference of signal intensities of respective peaks of an actually acquired mass spectrum and the standard spectrum 34 and transmits error information to the control portion 32. The control portion 32 changes a parameter of the MS portion 20 to reduce the error. For example, the control portion 32 changes a voltage applied to the ion lens 22, changes a bias voltage applied to the quadrupole filter 23, or changes a ratio of the direct current voltage to the high frequency voltage applied to the quadrupole filter 23 (step S2). By such an adjustment, patterns of the mass spectrum of the standard sample measured by the apparatus and the pattern of the standard sample standard spectrum are made to be substantially equal to each other. For example, as shown by FIG. 3, according to the standard sample standard spectrum, peak mass numbers are five of 69, 131, 219, 414, 502, and when ratios of respective peak intensities are 100, 30, 30, 4, 4[%], by constituting target values thereby, adjustment is executed such that ratios of intensities of respective peaks of a measured mass spectrum become the target values.

In the related art, calibration is finished only by the above-mentioned processings. However, when a dispersion in a purity of the standard sample prepared in the standard sample introducing portion 25 is large, even when processings of steps S1 and S2 are executed, actually, there is a possibility that patterns of mass spectra for the same sample obtained by a plurality of apparatus do not coincide with each other. Hence, according to GC/MS of the embodiment, processings at step S3 and thereafter are executed.

That is, next, an adjusting sample is introduced into the GC portion 10, and an object substance the component of which is separated by the column 16 is subjected to mass spectrometry by the MS portion 20 to acquire a mass spectrum under control of the control portion 32 (step S3). That is, the automatic sampler 11 of the GC portion 10 selects an adjusting sample 13 to inject to the sample vaporizing chamber 14 by the injector 12. The adjusting sample is immediately vaporized in the sample vaporizing chamber 14 and is introduced into the column 16 by being borne on the carrier gas flow. In passing the column 16, various components included in the sample are separated and therefore, even when an impurity is mixed thereto, such an impurity and the object substance can be separated from each other. Further, when the object substance comes out from the column 16, mass spectrometry is executed for the object substance at the MS portion 20. The data processing portion 31 forms a mass spectrum based on a detecting signal received from the ion detector 24.

Now, assume that there are provided signal intensities of respective peaks of mass spectra provided as results of executing the processing of step S3 by two sets of GC/MS's of, for example, apparatus A and apparatus B as shown by FIG. 4. That is, with regard to peak mass numbers of 51, 127, 198, 275, 442, ratios of respective peak intensities in apparatus A are 42, 27, 50, 16, 100[%] and ratios of respective peak intensities of apparatus B are 35, 26, 46, 16, 100[%].

Next, the data processing portion 31 reads the adjusting sample standard spectrum 35 from the storing portion 33 and calculates conversion coefficient Kn from ratios of signal intensities of respective peaks of an actually acquired mass spectrum and the adjusting sample standard spectrum 35 by the following equation for respective mass numbers emerging in the mass spectrum (step S4).

$$Kn = \text{(intensity of standard spectrum)/(intensity of actually measured spectrum of apparatus)}$$

where notation n designates a numeral attached to each peak in an order from, for example, smaller mass numbers. Now, when ratios of respective peak intensities of adjusting sample standard spectra 35 are 45, 45, 75, 35, 100[%] as shown by FIG. 4, the conversion coefficients Kn (n=1 through 5) of the apparatus A are calculated as 1.07, 1.67, 1.5, 2.19, 1.

Since calibration using the standard sample has already been executed as described above, when the standard sample is ideal, according to the mass spectrum of the adjusting sample, a difference is not to be brought about among apparatus. In other words, it seems that the difference is brought about here in the mass spectrum of the adjusting sample is caused by a dispersion in a purity of the standard sample as a main factor. Therefore, the above-described conversion coefficients of Kn can be regarded as numerical values reflecting the dispersion in calibration using the standard sample. Next, although recalibration is executed in order to resolve the dispersion emerged in the conversion coefficient Kn, a mass number of the conversion coefficient Kn is not equal to a mass number of a peak emerged in the mass spectrum of the standard sample. Hence, the above-described conversion coefficient Kn is corrected to a value in correspondence with the peak mass number of the standard sample (step S5). Specifically, a conversion coefficient fn in correspondence with a peak mass number on the mass spectrum of the standard sample is calculated by executing linear interpolation at respective intervals of the conversion coefficients Kn mass numbers of which are contiguous to each other. Naturally, the conversion coefficient fn in correspondence with the peak mass number of the mass spectrum of the standard sample may be calculated by a method other than linear interpolation, for example, higher order interpolation.

Now, when the conversion coefficient fn is calculated from a correspondence relationship between the mass number and the conversion coefficient Kn as shown by FIG. 4, fn (1 through 5) are calculated as 1.21, 1.66, 1.69, 1.20, 1.00 as shown by FIG. 5. Intensity ratios T [%] are calculated by multiplying the conversion coefficients fn by the peak intensities of the standard sample standard spectrum for respective mass numbers, and intensity ratios T' [%] are calculatedby normalizing a maximum value of the intensity ratio T to 100[%]. That is, the intensity ratios T' [%] constitute a modified standard spectrum in consideration of the dispersion in the standard sample provided to the apparatus (step S6).

Hence, by a procedure similar to those of step S1, S2, a mass spectrum is acquired again by subjecting the standard sample to mass spectrometry (step S7), and respective portions of the MS portion 20 are adjusted such that the measured mass spectrum becomes proximate to the pattern of the modified standard spectrum at this occasion (step S8). Thereby, the GC/MS is calibrated by constituting a reference by the adjusting sample which is not influenced by the purity of the sample or the like, and the difference among apparatus can also be resolved by executing calibration for respective apparatus by a similar method.

Further, it is apparent that the above-described embodiment is only an example of the invention and can pertinently be modified, added or corrected within the range of the gist of the invention. For example, although an explanation has been given of GC/MS according to the above-described embodiment, it can easily be predicted that the invention is applicable to various apparatus combined with chromatographs and mass spectrometric apparatus for separating components of samples and applicable similarly also to, for example, LC/MS. Naturally, an adjusting sample or the like adopted to LC/MS is used.

What is claimed is:

1. A chromatograph mass spectrometric apparatus for separating a plurality of components of a sample over time by a column of a chromatograph portion and introducing the respective components to a mass spectrometric portion to successively subject to mass spectrometry, the chromatograph mass spectrometric apparatus comprising:

a) a preparatory adjusting section for adjusting various parameters of the mass spectrometric portion by constituting a target by a predetermined standard spectrum for a standard sample while acquiring a mass spectrum of the standard sample by introducing the standard sample to the mass spectrometric portion;

b) an adjusting sample analyzing section for introducing a predetermined adjusting sample including a substance a mass spectrum of which is known to the mass spectrometric portion and acquiring a mass spectrum for the substance of the adjusting sample in a state of being adjusted by the preparatory adjusting section;

c) an information modifying section for modifying the predetermined standard spectrum for the standard sample based on a difference between a mass spectrum for the adjusting sample actually provided from the adjusting sample analyzing section and a predetermined standard spectrum of the adjusting sample; and d) a final adjusting section for adjusting the various parameters of the mass spectrometric portion by constituting a target by a modified standard spectrum provided from the information modifying section while acquiring a mass spectrum by introducing the standard sample to the mass spectrometric portion.

2. A method of calibrating a chromatograph mass spectrometric apparatus for separating a plurality of components of a sample over time by a column of a chromatograph portion and introducing the respective components to a mass spectrometric portion to successively subject to mass spectrometry, said method comprising:

a) adjusting various parameters of the mass spectrometric portion by constituting a target by a predetermined standard spectrum for a standard sample while acquiring a mass spectrum of the standard sample by introducing the standard sample to the mass spectrometric portion;

b) introducing a predetermined adjusting sample including a substance a mass spectrum of which is known to the mass spectrometric portion and acquiring a mass spectrum for the substance of the adjusting sample in a state of being adjusted in the step a);

c) modifying the predetermined standard spectrum for the standard sample based on a difference between a mass spectrum for the adjusting sample actually provided in the step (b) and a predetermined standard spectrum of the adjusting sample; and d) adjusting the various parameters of the mass spectrometric portion by constituting a target by a modified standard spectrum provided in the step (c) while acquiring a mass spectrum by introducing the standard sample to the mass spectrometric portion.

* * * * *